No. 825,931. PATENTED JULY 17, 1906.
G. OBERT.
FILTERING PLANT.
APPLICATION FILED MAR. 2, 1906.
2 SHEETS—SHEET 1.
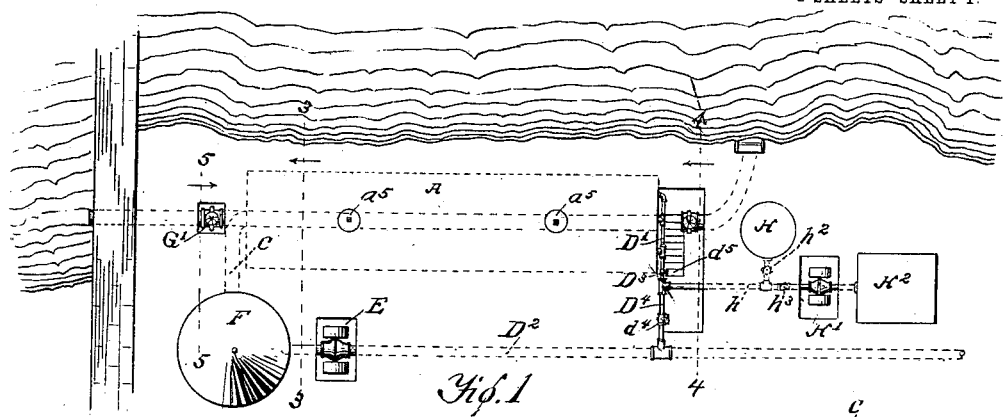
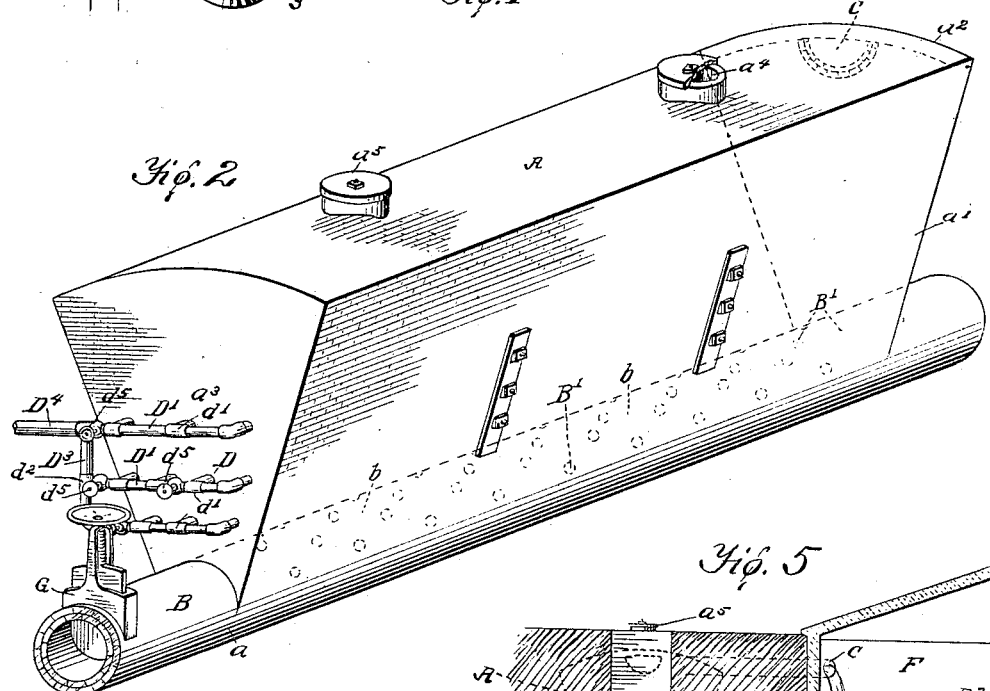
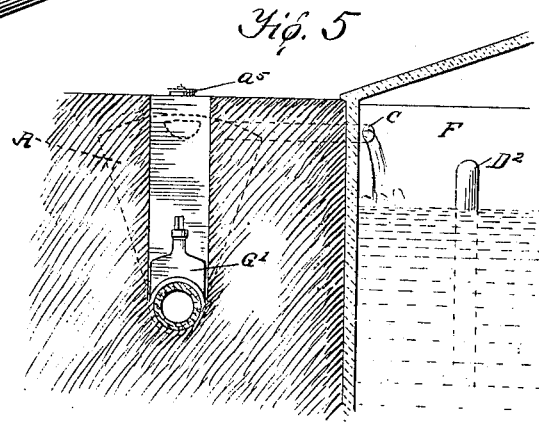
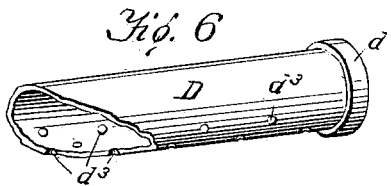
Witnesses
E. H. Lichtenberg
Clara McKee
Inventor
Gustav Obert
by N. DuBois Atty.

No. 825,931. PATENTED JULY 17, 1906.
G. OBERT.
FILTERING PLANT.
APPLICATION FILED MAR. 2, 1906.
2 SHEETS—SHEET 2.
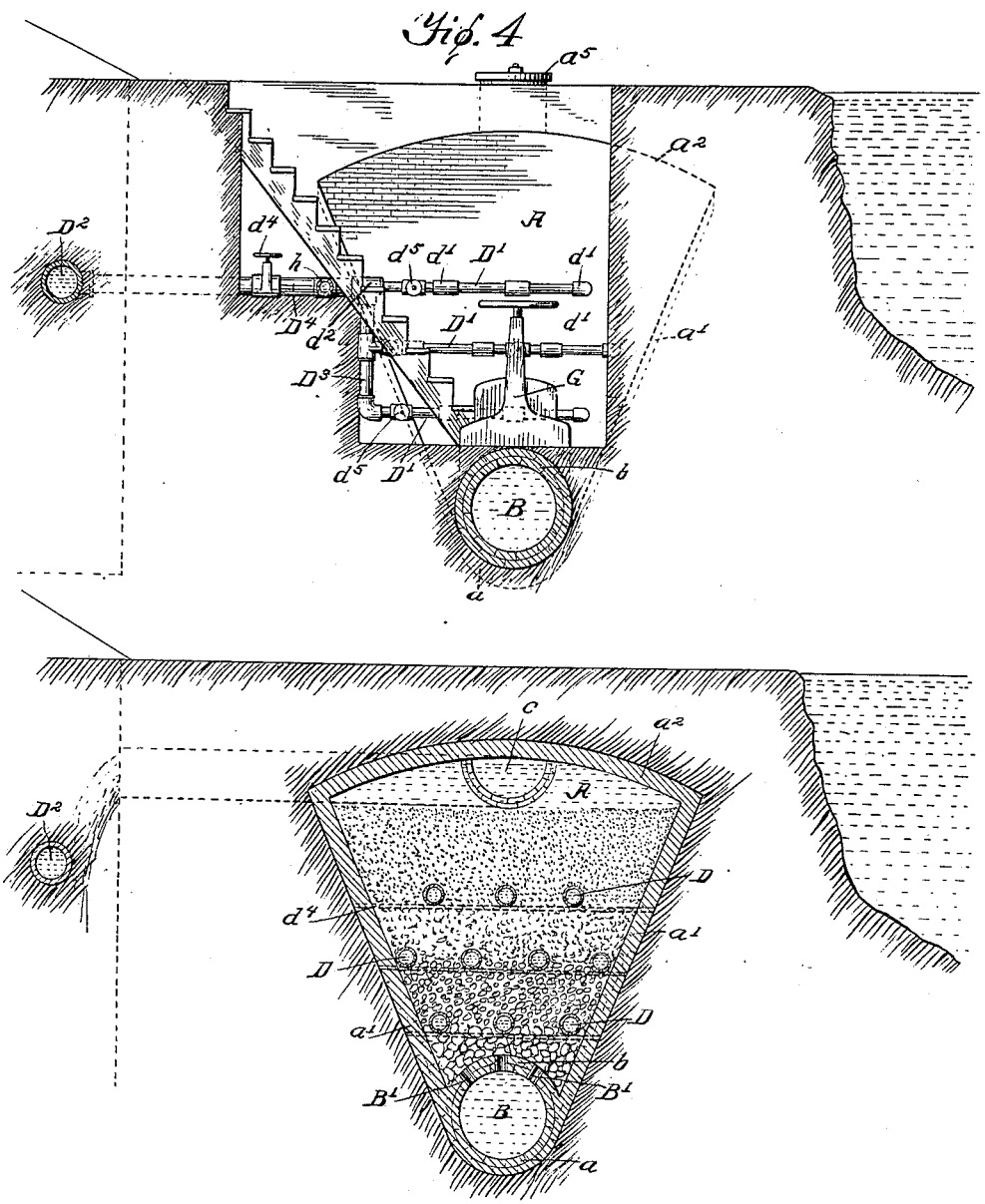
Witnesses
E. H. Lichtenberg
Clara McKee
Inventor
Gustav Obert
by N. DuBois, Atty.

UNITED STATES PATENT OFFICE.

GUSTAV OBERT, OF SPRINGFIELD, ILLINOIS.

FILTERING PLANT.

No. 825,931.  Specification of Letters Patent.  Patented July 17, 1906.

Application filed March 2, 1906. Serial No. 303,819.

*To all whom it may concern:*

Be it known that I, GUSTAV OBERT, a citizen of the United States, residing at Springfield, in the county of Sangamon and State of Illinois, have invented a certain new and useful Filtering Plant, of which the following is such a full, clear, and exact description as will enable others skilled in the art to which it appertains to make and use my said invention.

This invention relates to a plant for filtering water for city use; and the general purpose of the invention is to provide a system of water filtration and purification which shall be of reasonable first cost, inexpensive in maintenance, and simple and effective in operation.

The more specific purposes of my invention are to provide a filtering-chamber of such form that the coarser filtering material through which the water first passes shall be of materially less cross-sectional area than the overlying finer filtering material, to the end that the pressure of the water on the finer filtering material may be spread over a greater area, and therefore less likely to disturb and stir up the finer filtering material, and thereby rile the water, and having the further practical advantage that the more bulky material may lie next to the arch of the tunnel through which the water is admitted, thereby reducing to the minimum the danger of clogging the inlet-opening of the arch; to provide a filtering-chamber the bottom wall of which conforms to and forms part of the intake-tunnel, said filtering-chamber also having at its upper part large capacity for filtered water; to provide an intake-tunnel of improved construction; to provide means for cleansing the filtering material by water under pressure or for aerating or chemically treating the water in the filter; to provide simple and effective means for controlling the water applied in cleansing the filter, and to provide means for conveying away the dirt and the water removed from the filter and disposing of same without risk of contaminating the source of water-supply.

With these ends in view my invention consists in the novel features of construction and combinations of parts shown in the annexed drawings, to which reference is hereby made, and hereinafter particularly described, and finally recited in the claims.

Referring to the drawings, in which similar reference-letters designate like parts in the several views, Figure 1 is a diagram illustrating a source of water-supply, the position of the filtering plant relative to the source of water-supply, and the position of the pumps, the well, and the tank of the filtering plant and the system of pipes connecting the different parts of the plant. Fig. 2 is an enlarged isometric projection of the filtering-chamber and the intake-tunnel. Fig. 3 is an enlarged vertical section on the line 3 3 of Fig. 1. Fig. 4 is an enlarged vertical transverse section on the line 4 4 of Fig. 1. Fig. 5 is an enlarged partial vertical section on the line 5 5 of Fig. 1, and Fig. 6 is an enlarged partial perspective view of one of the pipes detached.

The filtering plant is especially adapted for use in filtering water taken from a running stream, a dam being placed across the stream to raise the water to a level which will permit the water to flow through the filtering-chamber and so situated that the sludge and scourings may be delivered below the dam, where they will not contaminate the water-supply.

The preferable form of the filtering-chamber is clearly shown in the drawings. In constructing the filter a pit of proper dimensions is dug in the ground, the proper slant being given to the sides of the pit and the bottom of the pit being shaped to conform to the outside of the tunnel.

The main structure A, which is preferably of brick laid in cement, consists of a bottom part $a$ in the form of an inverted arch and forming part of the intake-tunnel B, outwardly-inclined walls $a'$, and an arched top $a^2$. The upper wall or arch $b$ of the intake-tunnel B is of brick laid in cement, and its sides abut against and are bonded in the walls $a'$. Drain-tile B' of suitable dimensions and placed at suitable distances apart are built into the arch $b$ of the tunnel B. Horizontal pipes D, preferably of iron, are arranged in tiers within the filtering-chamber A and are built into the end walls thereof and are stayed by suitable stay-rods $d^4$, built into the side walls $a'$. The pipes D are closed at one end by screw-caps $d$. Pipes D' are connected with the pipes D by suitable couplings $d'$. Valves $d^5$ control the supply of water passing through the pipes D'. Couplings $d^2$ connect the pipes D' with the header $D^3$. The main service-pipe $D^2$ is connected with the pump E, and the pump takes water from the well F and forces it through the pipe $D^2$, to be distributed in the usual manner. A pipe $D^4$ connects the header $D^3$ with the main service-pipe $D^2$. A valve $d^4$ controls the flow of water through the pipe $D^4$. The lower half of each of the pipes D is pierced by a series of outwardly-tapering holes $d^3$. The holes $d^3$ are made tapering, so that water under pressure in the pipes will effectively remove any dirt or obstructions getting into the holes.

If desired, air or chemicals for aerating, sterilizing, clarifying, or otherwise treating the water may be introduced into the filter-beds through the pipes D. In that case the pipe $D^4$ may be connected with an air-reservoir H by pipes $h$, so that compressed air will flow through the pipes $h$ and $D^4$ into the header $D^3$ and thence into and through the pipes $D'$, or the pipe $D^4$ may be connected with an auxiliary pump $H'$, which is connected with a suitably-placed tank $H^2$, containing the requisite chemicals, the pump and its connections being adapted to convey the chemicals through the pipe $D^4$ to the header $D^3$ and thence through the pipes $D'$. Valves $h^2$ and $h^3$, respectively, control the flow of air and chemicals, as described. The parts being constructed and arranged as described, the injection of air or chemicals into the filter-bed will be accomplished during the upward flow of the water through the filter and without interfering therewith. Manholes $a^4$, provided with suitable covers $a^5$, afford access to the filter-chamber. A runway C, of brick laid in cement, conveys the filtered water from the filtering-chamber into the well F, from which it is pumped and distributed in the usual manner. A gate-valve G controls the admission of water to the tunnel, and a gate-valve $G'$ controls the discharge of water from the tunnel, as hereinafter explained. Immediately above the arch of the intake-tunnel is a layer of stone, above that a layer of coarse gravel, above that fine gravel, and above that a layer of sand. The thickness of the different layers of filtering material will be controlled by the conditions of use of the filtering plant and may be varied at pleasure.

In practical use of the filtering plant the gate G is opened to admit water into the tunnel, and the water flows upward through the tile and circulates around the gravel and sand and as it flows through the filtering material is freed from all impurities, and the pure water accumulating in the upper part of the filter flows out through the runway C to the well, to be pumped therefrom and distributed in the usual manner.

In practice mud, sand, and the larger or heavier impurities carried in the water settle on the bottom of the tunnel and do not enter the filtering-chamber. The lighter and smaller impurities are arrested by the filtering material in the chamber, so that when the water reaches the runway C it is thoroughly filtered and free from impurities. The tunnel is inclined, as shown in Fig. 4, in order that the sludge settling in the tunnel will flow downward and accumulate near the outlet-valve $G'$.

During the operation of cleaning the filter-bed the water discharged from the pipes D flows swiftly into and through the tunnel and drives the accumulated sludge outward through the valve $G'$. When the filter has been in use long enough to require cleansing, the procedure in cleansing the filter will be as follows: The gate-valve G will first be closed to stop the flow of water into the tunnel and the valve $G'$ will be opened to permit the escape of the sludge and scourings. The valves $h^2$ and $h^3$ being closed, the valve $d^4$ will be opened to permit water under pressure to pass from the pipe $D^4$ into the header $D^3$. One or more of the valves $d^5$ will then be opened, and the water will be forced through the pipes D and emerging from the pipes through the holes $d^3$ will pass downward through the filter-beds and through the tiles into the tunnel and thence outward through the valve $G'$. The water in the pipes D being under pressure serves to thoroughly wash the filter-bed below the pipes and remove the impurities which have accumulated therein and also to drive the sludge out of the tunnel. The valves $d^5$ may be opened one at a time or all together. In practice I prefer to first open the upper valve and cleanse the upper stratum, then open the intermediate valves and cleanse the intermediate stratum, and then open the lower valve and cleanse the lower stratum.

During the washing of the several strata, as described, the water from the upper part of the chamber seeps down through the upper strata of filtering material and cleanses them. The filter being cleansed as described, the valve $G'$ will be closed and the gate-valve G will be opened to admit water through the tunnel, and the operation of filtering will proceed as before. In applying the air the procedure will be the same, except that the valves $d^4$ and $h^3$ will be closed and the valve $h^2$ will be open. In applying the chemicals the procedure will be the same, except that the valve $h^3$ will be open and the valves $h^2$ and $d^4$ will be closed.

Having fully described my invention, what I claim as new, and desire to secure by Letters Patent, is—

1. A filter structure comprising a bottom wall constituting the lower member of an intake-tunnel communicating with the interior of said structure, end walls, inclined side walls, an arched top supported on said side walls, a runway communicating with the interior of said structure and a perforated tunnel-arch supported on the side walls of said structure.

2. A filter structure comprising a bottom wall constituting the lower member of an intake-tunnel, inclined side walls, end walls, an arched top supported on said side walls, a runway communicating with the interior of said structure, a perforated tunnel-arch supported on the side walls of said structure and perforated pipes supported on the walls of said chamber above the tunnel-arch.

3. A filter structure comprising a bottom wall constituting the lower member of an intake-tunnel, inclined side walls, end walls, perforated pipes supported on the end walls and a perforated tunnel-arch supported on the side walls; in combination with a well, a runway connecting said filter structure with said well, and means for forcing water from said well through the perforated pipes in the filter structure.

4. The combination of a filter structure relatively wide in its upper part and having converging walls forming in its lower part an intake-tunnel having a perforated arch, perforated pipes supported on said structure, means for supplying water under head within the intake-tunnel, an air-reservoir adjacent to said filter structure, means for conveying air from the air-reservoir to the perforated pipes within the filter structure to aerate the ascending water and means for conducting away the aerated water.

5. The combination of a filter structure relatively wide in its upper part and having converging walls forming in its lower part an intake-tunnel having a perforated arch, means for supplying water under head within the intake-tunnel, perforated pipes within said filter structure, a receptacle for chemicals adjacent to the filter structure and communicating with said perforated pipes and means for forcing chemicals from said receptacle into and through said perforated pipes.

6. The combination of a filter structure relatively wide in its upper part and having converging walls forming in its lower part a perforated intake-tunnel receiving water under head, perforated pipes within said filter structure, an inlet-valve controlling the supply of water to said tunnel, a discharge-valve controlling the discharge of water from said tunnel and means for forcing liquids through said perforated pipes against the upward flow of water through the perforated arch of the tunnel when said inlet-valve is open and said discharge-valve is closed.

7. The combination of a filter structure relatively wide in its upper part and having converging walls forming in its lower part a perforated intake-tunnel, perforated pipes in tiers in said filter structure, an inlet-valve controlling the supply of water to said tunnel, a discharge-valve controlling the discharge of water from said tunnel, graded filtering material in layers corresponding to the tiers of perforated pipes, valves respectively controlling the supply of liquids to the rows of perforated pipes, and means for forcing liquids through said perforated pipes to successively cleanse the several layers of filtering material and discharge the sludge and scourings from the tunnel, when the inlet-valve is closed and the outlet-valve is open.

8. The combination of a filter structure relatively wide in its upper part and having converging walls uniting to form the bottom member of a tunnel, a perforated top tunnel member supported on the side walls, and an arched top supported on the side walls; a well adjacent to said filter structure, a runway connecting the well with the filter structure, an inlet-valve controlling the admission of water to the tunnel, an outlet-valve controlling the discharge of the contents of the tunnel, perforated pipes supported in the filter structure, a main pipe adjacent to the filter structure, a pump adapted to take water from the well and force it through the main pipe, a lateral pipe connected with the main pipe, a header connected with said lateral pipe and said perforated pipes, a valve on the lateral pipe controlling the delivery of water to the header and valves controlling the delivery of water from the header to the perforated pipes.

9. The combination of a filter structure expanded in its upper part and contracted to form a longitudinal perforated tunnel in its lower part, perforated tubes supported in the filter structure, an inlet-valve controlling the supply of water to the tunnel, an outlet-valve controlling the discharge of the contents of said tunnel, a well adjacent to the filter structure, a runway connecting the well with the filter structure, a main pipe adjacent to the filter structure, a pump adapted to take water from the well and force it through the main pipe, a lateral pipe connected with the main pipe, a header connected with the perforated pipes and the lateral pipe, a valve controlling the supply of water through the lateral pipe, valves controlling the delivery of the contents of the header into the perforated pipes, an air-reservoir adjacent to the filter structure, a branch pipe connecting the air-reservoir with said lateral pipe and a valve on said branch pipe controlling the supply of air to the lateral pipe; all so constructed and arranged that when the valve on the lateral pipe is open and the valve on the branch pipe is closed water alone will be delivered into the header, and when the valve on the lateral pipe is closed and the valve on the branch pipe is open air alone will be delivered into the header and when both valves are open both water and air will be delivered into the header.

10. The combination of a filter structure, a tunnel lengthwise of and integral with the filter structure and tiles built in the crown of the tunnel within the filter structure.

11. The combination of a filter structure, a perforated tunnel lengthwise of and integral with the filter structure, an inlet-valve controlling the admission of water to said tunnel, an outlet-valve controlling the discharge of the contents of said tunnel, perforated pipes in the filter structure, a well, a main pipe, an air-reservoir and a tank for chemicals adjacent to the filter structure, a runway connecting the well with the filter structure, a pump adapted to pump water from the well through said main pipe, a lateral pipe connected with said main pipe, a valve on the lateral pipe, a header connected with the lateral pipe and the perforated pipes in the filter structure, valves controlling the discharge of the contents of the header into said perforated pipes, a pump connected with said tank, a branch pipe connecting said pump with said lateral pipe, a valve on said branch pipe controlling the delivery of chemicals to the lateral pipe, a sublateral pipe connecting the air-reservoir with the branch pipe, and a valve controlling the supply of air to the branch pipe; all constructed and arranged to deliver into the header, water alone, air alone, chemicals alone, water and air together, water and chemicals together and water, air and chemicals all together.

In witness whereof I have hereunto signed my name, at Springfield, Illinois, this 29th day of January, 1906.

GUSTAV OBERT.

Witnesses:
E. H. LICHTENBERG,
MARGARET McDONALD.